United States Patent
Hatteland et al.

(10) Patent No.: US 12,172,838 B2
(45) Date of Patent: Dec. 24, 2024

(54) ROUTING OF CONTAINER HANDLING VEHICLES OPERATING AN AUTOMATED STORAGE SYSTEM

(71) Applicant: Autostore Technology AS, Nedre Vats (NO)

(72) Inventors: Tommy Hatteland, Oslo (NO); Torgeir Lilleskog, Aksdal (NO); Vegard Syre-Aaker, Asker (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 18/525,148

(22) Filed: Nov. 30, 2023

(65) Prior Publication Data

US 2024/0092581 A1    Mar. 21, 2024

Related U.S. Application Data

(63) Continuation of application No. 18/011,435, filed as application No. PCT/EP2021/073547 on Aug. 25, 2021.

(30) Foreign Application Priority Data

Aug. 26, 2020    (NO) .................................. 20200927

(51) Int. Cl.
B65G 1/137    (2006.01)
(52) U.S. Cl.
CPC .... B65G 1/1375 (2013.01); *B65G 2201/0235* (2013.01)
(58) Field of Classification Search
CPC .. B65G 1/0492; B65G 1/0457; B65G 1/1378; B65G 2201/0235; B65G 1/1375; G05D 2201/0216
See application file for complete search history.

(56) References Cited

U.S. PATENT DOCUMENTS

| | | | |
|---|---|---|---|
| 11,312,575 B2 | 4/2022 | Austrheim | |
| 2009/0136328 A1* | 5/2009 | Schafer | B65G 1/1378 414/807 |

(Continued)

FOREIGN PATENT DOCUMENTS

| | | |
|---|---|---|
| EP | 3035074 A1 | 6/2016 |
| NO | 317366 B1 | 10/2004 |

(Continued)

OTHER PUBLICATIONS

International Search Report issued in PCT/EP2021/073547 on Dec. 2, 2021 (6 pages).

(Continued)

*Primary Examiner* — Kyle O Logan
(74) *Attorney, Agent, or Firm* — Baker Botts L.L.P.

(57) ABSTRACT

A method, control system 500 and computer program for routing and rerouting of container handling vehicles 201 handling storage containers 106 in an automated storage and retrieval system comprising a framework structure 100 forming a three-dimensional storage grid structure 104 for storing the storage containers 106 in storage columns 105, the framework structure including a grid-based rail system 108 arranged above the storage columns 105 with the rail system 108 providing available routes for the container handling vehicles 201 handling and transferring the storage containers 106 to and from the storage columns 105, and wherein each container handling vehicle 201 comprises a first set of wheels configured to move the vehicle along a first lateral direction (X) of the grid-based rail system and a second set of wheels configured to move the vehicle along a second lateral direction (Y) of the grid-based rail system (108), the second direction (Y) being perpendicular to the first direction (X), the movements of the container handling vehicles being controlled by a control system 500, that (Continued)

determines which tasks are to be done by specified container handling vehicles 201, destination locations for performing the tasks and which routes the container handling vehicles 201 are to travel on the rail system 108. The method comprises the following steps performed by the control system 500 when executing the computer program: running 410 a multi-agent pathfinding algorithm, MAPF, in the control system 500 for establishing and assigning routes on the rail system 108 for the container handling vehicles 201 from their current locations to assigned tasks at destination locations; determining 420 how far the container handling vehicles 201 can travel on a first part of the assigned routes within a set time interval, the first part being shorter than the assigned routes to the destinations; locking 430 the first parts of the assigned routes that the container handling vehicles 201 can travel within the set time interval; instructing 440 the container handling vehicles 201 to move from their current locations to an end location on the assigned locked routes; repeating steps above.

20 Claims, 3 Drawing Sheets

(56) References Cited

U.S. PATENT DOCUMENTS

| | | | |
|---|---|---|---|
| 2011/0093134 A1 | 4/2011 | Emanuel et al. | |
| 2011/0203231 A1* | 8/2011 | Hortig | B65B 67/02 53/235 |
| 2012/0101627 A1* | 4/2012 | Lert | B65G 1/1373 700/216 |
| 2014/0100735 A1 | 4/2014 | Yoneda | |
| 2015/0086304 A1* | 3/2015 | Hasman | B65G 1/1378 414/269 |
| 2015/0127143 A1* | 5/2015 | Lindbo | G05B 15/02 700/218 |
| 2016/0009493 A1* | 1/2016 | Stevens | B65G 1/1373 700/216 |
| 2016/0129587 A1* | 5/2016 | Lindbo | B65D 21/0209 700/218 |
| 2016/0130085 A1* | 5/2016 | Yamashita | B65G 1/1378 414/807 |
| 2016/0145058 A1* | 5/2016 | Lindbo | B65G 1/0457 700/218 |
| 2016/0325932 A1* | 11/2016 | Hognaland | B60L 15/40 |
| 2016/0355337 A1* | 12/2016 | Lert | B65G 1/0478 |
| 2017/0313514 A1* | 11/2017 | Lert, Jr. | B65G 1/0492 |
| 2017/0362039 A1* | 12/2017 | Eisenberg | B65G 47/46 |
| 2018/0029798 A1* | 2/2018 | Lindbo | B65G 1/137 |
| 2018/0043528 A1* | 2/2018 | Lindbo | B65G 1/0464 |
| 2018/0065804 A1* | 3/2018 | Hognaland | B65G 1/0464 |
| 2018/0075402 A1* | 3/2018 | Stadie | G05D 1/0255 |
| 2018/0162639 A1* | 6/2018 | Ingram-Tedd | B65G 1/0464 |
| 2018/0178979 A1* | 6/2018 | Bretz | B65G 1/0407 |
| 2018/0194571 A1* | 7/2018 | Fryer | B65G 1/065 |
| 2018/0237221 A1* | 8/2018 | Lindbo | A62C 3/002 |
| 2018/0244467 A1* | 8/2018 | Hognaland | B65G 1/0478 |
| 2018/0299882 A1 | 10/2018 | Kichkaylo | |
| 2018/0305123 A1* | 10/2018 | Lert, Jr. | G06Q 10/087 |
| 2018/0346243 A1* | 12/2018 | Lindbo | B65G 1/1373 |
| 2019/0031399 A1* | 1/2019 | Shaikh | E04B 2/7403 |
| 2019/0054932 A1* | 2/2019 | Stadie | B61B 5/02 |
| 2019/0375588 A1* | 12/2019 | Lindbo | B65G 1/0464 |
| 2020/0031575 A1* | 1/2020 | Hognaland | B25J 9/1687 |
| 2021/0155408 A1 | 5/2021 | Austrheim | |
| 2022/0177229 A1 | 6/2022 | Austrheim | |

FOREIGN PATENT DOCUMENTS

| | | |
|---|---|---|
| WO | 2014090684 A1 | 6/2014 |
| WO | 2015/185628 A2 | 12/2015 |
| WO | 2015193278 A1 | 12/2015 |
| WO | 2019/238670 A1 | 12/2019 |

OTHER PUBLICATIONS

Written Opinion of the International Searching Authority issued in PCT/EP2021/073547 on Dec. 2, 2021 (12 pages).
International Preliminary Report on Patentability from PCT/EP2021/073547 mailed on Nov. 23, 2022 (18 pages).
Norwegian Search Report issued in NO 20200927 mailed on Mar. 31, 2021 (2 pages).
Silver, D.; "Cooperative Pathfinding"; Department of Computing Science, University of Alberta, 2005 (6 pages).
Bnaya, Z. et al.; "Conflict-Oriented Windowed Hierarchical Cooperative A"; IEEE International Conference on Robotics and Automation (Icra), May 31-Jun. 7, 2014, pp. 3743-3748 (6 pages).
Marko Peltonen, Office Action in Norwegian patent application No. 20200927, Norwegian Industrial Property Office, mailed Feb. 2, 2024, 2 pages.

* cited by examiner

ROUTING OF CONTAINER HANDLING VEHICLES OPERATING AN AUTOMATED STORAGE SYSTEM

FIELD OF THE INVENTION

The present invention relates to an automated storage and retrieval system for storage containers handled by container handling vehicles running on a grid-based rail system of the storage and retrieval system, and more specifically to a method, system and computer program for routing and rerouting the container handling vehicles according to available routes on the rail system.

BACKGROUND

FIG. 1 discloses a typical prior art automated storage and retrieval system 1 with a framework structure 100 and with container handling vehicles 201, also known as robots, operating on the system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of the framework structure 100, on which rail system 108 a plurality of container handling vehicles 201 are operated to raise storage containers 106 from, and lower storage containers 106 into, the storage columns 105, and also to transport the storage containers 106 above the storage columns 105.

The rail system 108 comprises a first set of parallel rails 110 arranged to guide movement of the container handling vehicles 201 in a first direction X across the top of the frame structure 100, and a second set of parallel rails 111 arranged perpendicular to the first set of rails 110 to guide movement of the container handling vehicles 201 in a second direction Y which is perpendicular to the first direction X.

Also shown in FIG. 1 is a first rail in a first direction X, 110a, a second rail in a first direction X, 110b, a first rail in a second direction Y, 111a and a second rail in a second direction Y, 111b. The container handling vehicles 201 move laterally above the storage columns 105, i.e. in a plane which is parallel to the horizontal X-Y plane.

The type of container handling vehicle 201 used can be any known in the art, e.g. one of the automated container handling vehicles disclosed in WO2014/090684A1 or in WO2015/193278A1 having a footprint covering one or two storage columns 105. The rail system 108 can be arranged as single- and/or double-track configurations.

Storage containers 106 are stored in the columns 105 which define a third direction Z which is orthogonal to the first direction X and the second direction Y. The storage containers 106 are accessed by the container handling vehicles 201 through access openings 112 in the rail system 108, i.e. the rail system 108 is arranged on the framework structure 100 defining the circumference of each access opening 112 on top of each storage column 105. The upright members 102 of the framework structure 100 may be used to guide the storage containers when these out from and lowering of the containers into the columns 105. The stacks 107 of containers 106 are typically self-supportive.

The storage volume of the framework structure 100 has often been referred to as a grid 104, where the possible storage positions within storage columns 105 in this grid is referred to as a storage cell. Each storage column 105 may be identified by a position in an X- and Y-direction, while each storage cell may be identified by a container number in the X, Y and Z-direction.

In the framework structure 100, most of the columns 105 are storage columns 105, i.e. columns 105 where storage containers 106 are stored in stacks 107. However, some columns 105 may have other purposes.

In FIG. 1, columns 119 and 120 are special-purpose columns used by the container handling vehicles 201 to drop off and/or pick up storage containers 106 so that they can be transferred to an access station (not shown) where the storage containers 106 can be accessed from outside of the framework structure 100 or transferred out of or into the framework structure 100. An access station is typically a picking or a stocking station where product items are removed from or positioned in the storage containers 106.

Within the art, columns for transferring a storage container in and out of the storage system is normally referred to as port column 119, 120 or a transfer column. A storage container is transferred to and from a port column 119, 120 via ports 119', 120' typically located at an opening at an end of the port column 119, 120. i.e. where storage containers are entering or exiting the port columns 119, 120. A port may also be located at other locations such as at a mid-level or ground level of a port column 119, 120.

Transportation and transferring of storage container 106 to an access station may be in any direction, that is horizontal, tilted and/or vertical. For example, the storage containers 106 may be placed in a random or dedicated column 105 within the framework structure 100, then picked up by any container handling vehicle 201 and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201 can drop off storage containers 106 to be transported to an access or a transfer station, and the second port column 120 may be a dedicated pick-up port column where the container handling vehicles 201 can pick up storage containers 106 that have been transported from an access or a transfer station.

When operating an automated storage and retrieval system 1, each container handling vehicle 201 is given a task by receiving instructions. A task may for instance be to retrieve a specific storage container 106 from a storage column 105 and deliver it at a port column 119 for further transport to an access station or to move a storage container 106 from one storage cell to another. This means that each container handling vehicle 201 is instructed to follow a set route on the rails 111 from its current location to a target location.

When a specific storage container 106 stored in one of the columns 105 disclosed in FIG. 1 is to be retrieved, one of the container handling vehicles 201 is assigned the task and instructed to retrieve the storage container 106 from its location and transport it to the port 119' of the port column 119. This operation involves moving the container handling vehicle 201 to a location above the storage column 105 in which the storage container 106 is located, retrieving the storage container 106 from the storage column 105 using a lifting device (not shown) of the container handling vehicle 201 and transporting the storage container 106 to the port 119' of the port column 119.

If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as digging within the art, may be performed with the same container handling vehicle 201 that is subsequently used for transporting the target storage container to the drop-off port column 119, or with one or a plurality of other cooperating container handling vehicles 201. Alternatively, or in addition, the automated storage and retrieval system 1 may have container handling vehicles 201 specifically dedicated to the task of temporarily removing storage containers from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201 is instructed to pick up the storage container 106 from the port 120' of the port column 120 transferring storage containers from an access or a transfer station and transport it to a location above the storage column 105 where it is to be stored. After any storage containers positioned at or above the target position within the storage column stack 107 have been removed, the container handling vehicle 201 positions the storage container 106 at the desired position. The removed storage containers 106 may then be lowered back into the storage column 105 or relocated to other storage columns.

Locations of each storage container 106 within the framework structure 100 and locations and movements of each container handling vehicle 201 operating on the storage and retrieval system are continuously monitored and controlled by a control system 500 as well as a reference to the content of each storage container 106 so that a desired storage container 106 can be delivered to the desired location at the desired time without the container handling vehicles 201 colliding with each other.

An example of a typical control system 500 is shown in FIG. 2. The control system 500 is adapted for transmitting operation and movement instructions to a vehicle controller 230 in each container handling vehicle 201 for controlling all movements and operations on the storage and retrieval system 1. The control system 500 instructs each vehicle 201 to store or retrieve storage containers 106. The current position of each vehicle 201 is communicated from a vehicle 201 to control system 500, thus enabling it to control the movements of all vehicles 201 on the rail system 108 in an optimal way without vehicles 150 queuing or colliding.

In the example shown, the control system 500 comprises a master controller 220, a database 210, a routing planner 200 and a transmitter/receiver 225 for communicating instructions to each container handling vehicle 201.

The database is keeping track of the location of the storage containers 106 as well as which storage container 106 to be handled at any time, i.e. which storage container 106 to be retrieved or stored in the storage grid 104. The routing planner 200 is adapted for finding optimal routes for the container handling vehicles 201.

The master controller 220 is adapted to coordinate information from the database 210 and the routing planner and to generate operational instructions to each container handling vehicle 201, e.g. which storage container to handle and which route on the rail system 108 to follow according to input from the routing planner 200.

The control system 500 communicates with a central computer where orders and tasks are transmitted to the control system 500.

An automated storage and retrieval system 1 typically operates with a plurality of container handling vehicles 201 transferring storage containers from one location to another. Larger storage and retrieval system can be populated with several hundred container handling vehicles 201 where each is assigned and given a task by receiving instructions transmitted from the control system 500. A task may for instance be to get a specific storage container 106 from a storage column 105 where it is located, follow a route by driving a set distance in set directions, deliver a storage container 106 at the port 119', etc.

Instructions are given by the control system 500 instructing each container handling vehicle 201 to perform a task and to follow a specific route from a current location to a target destination. The overall goal is to find the best route for each container handling vehicle 201 and routes that will not come into conflict with each other. The best route is typically the shortest route that will not conflict with other routes in the same timeframe.

Multi-agent pathfinding (MAPF) algorithms are known within the art of computer science and can be used to solve the problem of finding paths for multiple agents from their current locations to their target locations without colliding with each other, while at the same time optimizing a cost function, such as the sum of the path lengths of all agents.

For the storage and retrieval system 1, a container handling vehicle 201 represents an agent. Most of the MAPF algorithms are however one-shot algorithms solving a specific scenario where container handling vehicles 201 finalize their planned tasks following a set route from a current position to a final position to perform a task before making new routes according to new tasks. Adapting these multi-agent pathfinding algorithms to a dynamically changing environment, where container handling vehicles 201 might change type of task or target before finishing a first assigned task, or where there are new active container handling vehicles 201 operating on the storage system, is not trivial.

By using an MAPF algorithm, container handling vehicles 201 can be routed simultaneously, but since the MAPF algorithm has a considerable execution time, the container handling vehicles 201 must wait while new routes are being generated.

In the paper "Cooperative pathfinding", by David Silver in 2005 (www.aaai.org), a sliding window, defining a restricted area, is used for the routing to find non-colliding routes within the area in real-time environments. A cooperative search for possible routes is however limited to a fixed depth specified by the current window. Each agent searches for a partial route to its destination, and then begins following the route. At regular intervals, for instance when an agent is half-way through its partial route, the window is shifted forwards and a new partial route is computed. This means that the cooperative search is only considering agents within the sliding window, i.e. other agents outside of the window defining the restricted area are ignored. For finding the directions for agents to destinations, an abstract search in full depth is performed.

The present invention presents a method for routing where complete routes from current locations of container handling vehicles to destinations are found but where only a first part of each route is locked a set time frame. This method provides time efficient routing, and where rerouting can be performed without stopping the container handling vehicles.

SUMMARY OF THE INVENTION

The purpose of the invention is to provide an improved way of routing and rerouting container handling vehicles as they perform their operations when running on a rail system of a storage and retrieval system. A novel method, system and computer program provide more route alternatives for all container handling vehicles than previous routing did.

This is achieved by routing and rerouting of container handling vehicles as often as possible during their travel from their current locations to target destinations and doing this by considering all routes for all container handling vehicles from current locations to task at destination locations.

According to the inventive method, the routes of the container handling vehicles are calculated on the fly as the container handling vehicles move towards their destinations. The container handling vehicles can be efficiently rerouted to follow new routes to adapt to changes in traffic situation, and new routes can be created for newly active container handling vehicles.

The new method requires less time for finding new routes for all container handling vehicles without stopping them and provides more route alternatives for all container handling vehicles. According to the method, MAPF is used for finding routes for all container handling vehicles to their final destinations, but where only a first part of each route is locked for a set time interval in contrast to prior art where the complete route is locked or where only routes for vehicles within a restricted area defined by a sliding window is assessed, as described in the above mentioned paper by David Silver.

The new method provides more route alternatives as the container handling vehicles move along their assigned routes since the part of each route that has been covered is freed up for new routes as well as the part of an assigned routes that has not yet been locked.

The inventive method provides a fluid, ever changing system, and the MAPF not only allows for that but also it allows journey times to be shortened compared to previous planning algorithms because paths are blocked for less time.

The invention is defined by a method for routing and rerouting of container handling vehicles handling storage containers in an automated storage and retrieval system comprising a framework structure forming a three-dimensional storage grid structure for storing the storage containers in storage columns the framework structure including a grid-based rail system arranged above the storage columns with the rail system providing available routes for the container handling vehicles handling and transferring the storage containers to and from the storage columns and wherein each container handling vehicle comprises a first set of wheels configured to move the vehicle along a first lateral direction (X) of the grid-based rail system and a second set of wheels configured to move the vehicle along a second lateral direction (Y) of the grid-based rail system, the second direction (Y) being perpendicular to the first direction (X), the movements of the container handling vehicles being controlled by a control system, that determines which tasks are to be done by specified container handling vehicles, destination locations for performing the tasks and which routes the container handling vehicles are to travel on the rail system.

The method comprises the following steps performed by the control system:

a. running a multi-agent pathfinding algorithm, MAPF, in the control system for establishing and assigning routes on the rail system for the container handling vehicles from their current locations to assigned tasks at destination locations;

b. determining how far the container handling vehicles can travel on a first part of the assigned routes within a set time interval, the first part being shorter than the assigned routes to the destinations;

c. locking the first parts of the assigned routes that the container handling vehicles can travel within the set time interval;

d. instructing the container handling vehicles to move from their current locations to an end location on the assigned locked routes;

e. repeating steps a) to d).

According to one embodiment of the method, an upper limit of the set time interval in step b) may correspond to an execution time the control system uses for executing the MAPF algorithm and instructing the container handling vehicles to move according to established routes. The distance a container handling vehicle covers on the rail system according to an assigned route within this time interval will then be the part of the complete route established by the MAPF that is locked.

According to one embodiment of the method, an upper limit of the set time interval in step b) may correspond to the elapsed time for all container handling vehicles to move from current positions to positions on the rail system located above nearest storage columns where they can change directions.

According to an embodiment of the method, the duration of the set time interval in step b) may be set according to the size of the automated storage and/or retrieval system and the number of container handling vehicles to be included in the MAPF algorithm.

According to an embodiment of the method, the method may include extending the locked part of the assigned route for a container handling vehicle which is given a priority.

According to an embodiment of the method, the method may include extending the locked part of the assigned route for a container handling vehicle which is not responding to instructions.

According to an embodiment of the method, the locked part of the assigned routes may be extended along the route established by the MAPF algorithm from the current location of the container handling vehicle to the task at the destination location.

According to an embodiment of the method, the locked routes may be excluded from consideration of available routes during running the MAPF algorithm.

According to an embodiment of the method, the clearance between each route established by the MAPF algorithm bay be adapted to the type of container handling vehicle travelling the assigned routes.

According to an embodiment of the method, the movements of the container handling vehicles may be controlled to avoid a possible queueing problem at the destination locations.

According to an embodiment of the method, the container handling vehicles may be redirected if a queueing problem is foreseen at the destination locations.

According to an embodiment of the method, the container handling vehicles may be redirected to positions or routes where container handling vehicles are not present or routed towards.

According to an embodiment of the method, the movements of the container handling vehicles may be controlled according to current load being carried and condition of the container handling vehicles.

The invention is further defined by a control system for controlling routing and rerouting of container handling vehicles handling storage containers in an automated storage and retrieval system comprising a framework structure forming a three-dimensional storage grid structure for storing the storage containers in storage columns, the framework structure including a grid-based rail system being arranged above the storage columns with the rail system providing available routes for the container handling vehicles handling and transferring the storage containers to and from the storage columns, and wherein each container handling vehicle comprises a first set of wheels configured to move the vehicle along a first lateral direction (X) of the grid-based rail system and a second set of wheels configured to move the vehicle along a second lateral direction (Y) of the grid-based rail system, the second direction (Y) being perpendicular to the first direction (X). The movements of the container handling vehicles are controlled by the control system that determines which tasks are to be done by specified container handling vehicles, destination locations for performing the tasks and which routes the container handling vehicles are to travel on the rail system.

The control system comprises a routing planner for finding optimal routes for the container handling vehicles, a database for keeping track of the storage containers, a master controller connected to a transmitter/receiver, where the control system is adapted for executing the method described above and for communicating control instructions to each container handling vehicle.

The invention is further defined by a computer program product that when executed by a processor in a control system of an automated storage and retrieval system performs the method described above for efficient routing and rerouting of container handling vehicles handling storage containers in an automated storage and retrieval system.

BRIEF DESCRIPTION OF THE DRAWINGS

The following drawings are appended to facilitate the understanding of the invention. The drawings show embodiments of the invention, which will now be described by way of example only, where.

REFERENCES

Figure 1:
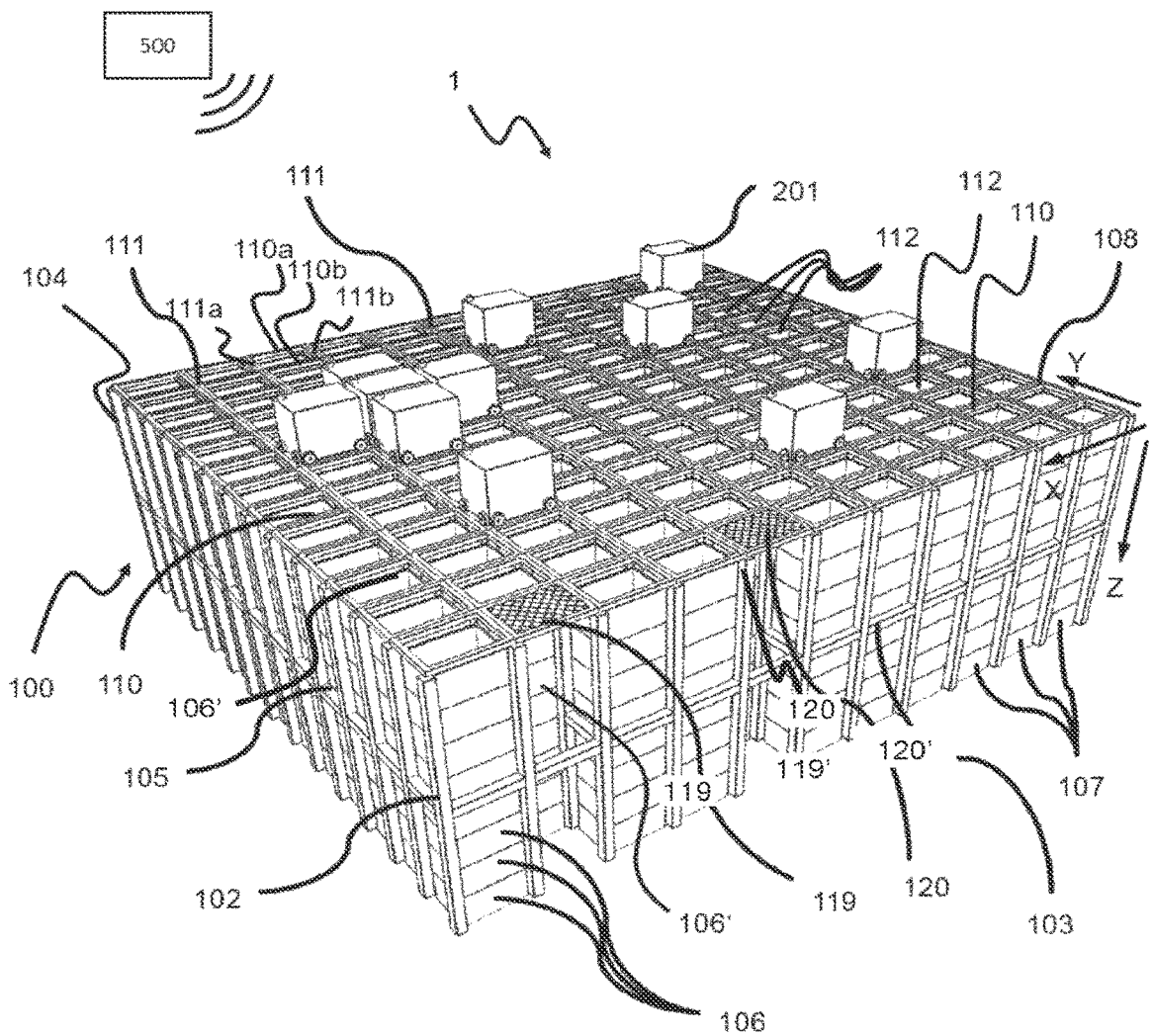
FIG. 1 is a perspective view of a framework structure of a prior art automated storage and retrieval system.

1—Automated storage and retrieval system
100—Framework structure
102—Upright members of framework structure
103—Horizontal members of framework structure
104—Storage grid structure
105—Storage column
106—Storage container
106'—Particular position of storage container
107—Stack
108—Rail system
110—Parallel rails in first direction (X)
110a—First rail in first direction (X)
110b—Second rail in first direction (X)
111—Parallel rail in second direction (Y)
111a—First rail of second direction (Y)
111b—Second rail of second direction (Y)
112—Access opening
119—first Port column
119'—first Port
120—second Port column
120'—second Port
200—Routing planner
201—Container handling vehicle
210—Database
220—Master controller
225—Transmitter/Receiver
230—Vehicle controller
X—First direction
Y—Second direction
Z—Third direction
500—Control system.

DETAILED DESCRIPTION OF THE INVENTION

In the following description, the invention will be explained in more detail with reference to the appended drawings. It should be understood, however, that the drawings are not intended to limit the invention to the subject-matter depicted in the drawings.

A typical prior art automated storage and retrieval system 1 with a framework structure 100 was described in the background section above with reference to FIG. 1.

The framework structure 100 can be of any size, and it is understood that it can be considerably wider and/or longer and/or deeper than the one disclosed in FIG. 1. For example, the framework structure 100 may have a horizontal extent of more than 700×700 storage columns 105 and a storage depth for storing more than twelve stacked storage containers 106, and where storage containers 106 are handled by hundreds of container handling vehicles 201 running on the rail system 108.

Also, the storage grid 104 can be considerably deeper than disclosed in FIG. 1, showing stacks of eight storage containers 106. For example, the storage grid 104 may be designed to hold twelve stacked storage containers 106.

The container handling vehicles 201 can be of any type known in the art, e.g. any one of the automated container handling vehicles disclosed in WO2014/090684 A1, in NO317366 or in WO2015/193278A1.

The rail system 108 arranged across the top of the framework structure 100 allows the container handling vehicles 201 to move horizontally between storage columns 105 and ports that they are interacting with, i.e. ports they are instructed to deliver or retrieve a storage container 106 to and from.

The automated storage and retrieval system 1 comprises a framework structure 100 forming a three-dimensional storage grid structure 104 with a grid-based rail system 108 for storing the storage containers 106 in storage columns 105, the grid-based rail system 108 being arranged above the storage columns 105 with the rail system 108 providing available routes for the container handling vehicles 201 handling and transferring the storage containers 106 to and from the storage columns 105, and wherein each container handling vehicle 201 comprises a first set of wheels configured to move the vehicle along a first lateral direction (X) of the grid-based rail system and a second set of wheels configured to move the vehicle along a second lateral direction (Y) of the grid-based rail system 108, the second direction (Y) being perpendicular to the first direction (X), the movements of the container handling vehicles are controlled by a control system 500, that determines which tasks to be done by specified container handling vehicles 201, destination locations for performing the tasks and which routes the container handling vehicles 201 are to travel on the rail system 108.

Figure 2:
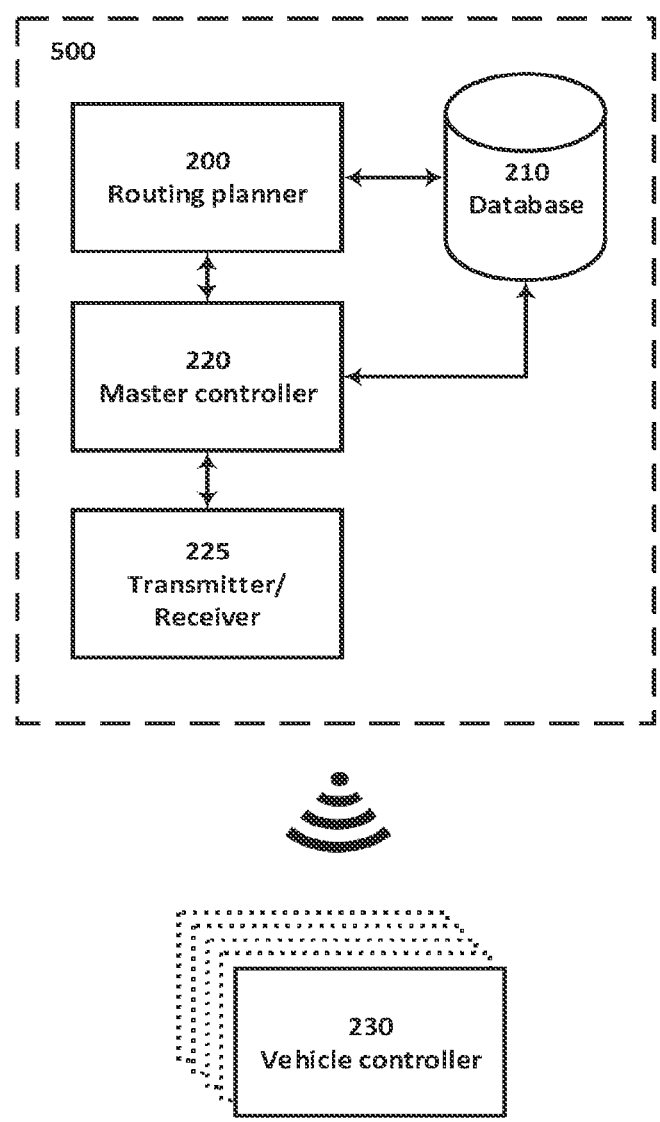
FIG. 2 shows an example of a control system for controlling container handling vehicles operating on an automated storage and retrieval system.

FIG. 2 shows an example of a control system 500 for controlling the container handling vehicles 201 according to an embodiment of the invention. In this example, the control system 500 comprises a master controller 220, a database 210 that is used for keeping track of the storage containers 106, a routing planner 200 used for finding optimal routes for the container handling vehicles 201 and a transmitter/receiver 225 for communicating instructions to each container handling vehicle 201. The figure shows that the routing planner 200 is connected to the database 210. This may however not be the case as the routing planner 200 may receive all necessary information from the master controller 220.

The control system 500 typically communicates with a central computer where orders and tasks are transmitted to the control system 500. The control system 500 further communicates with vehicle controllers 230 in each container handling vehicle 201 and controls traffic flow of the container handling vehicles 201 according to input from the routing planner 200. The communication is preferably performed wirelessly, e.g. via radio signals, light signals.

Figure 3:
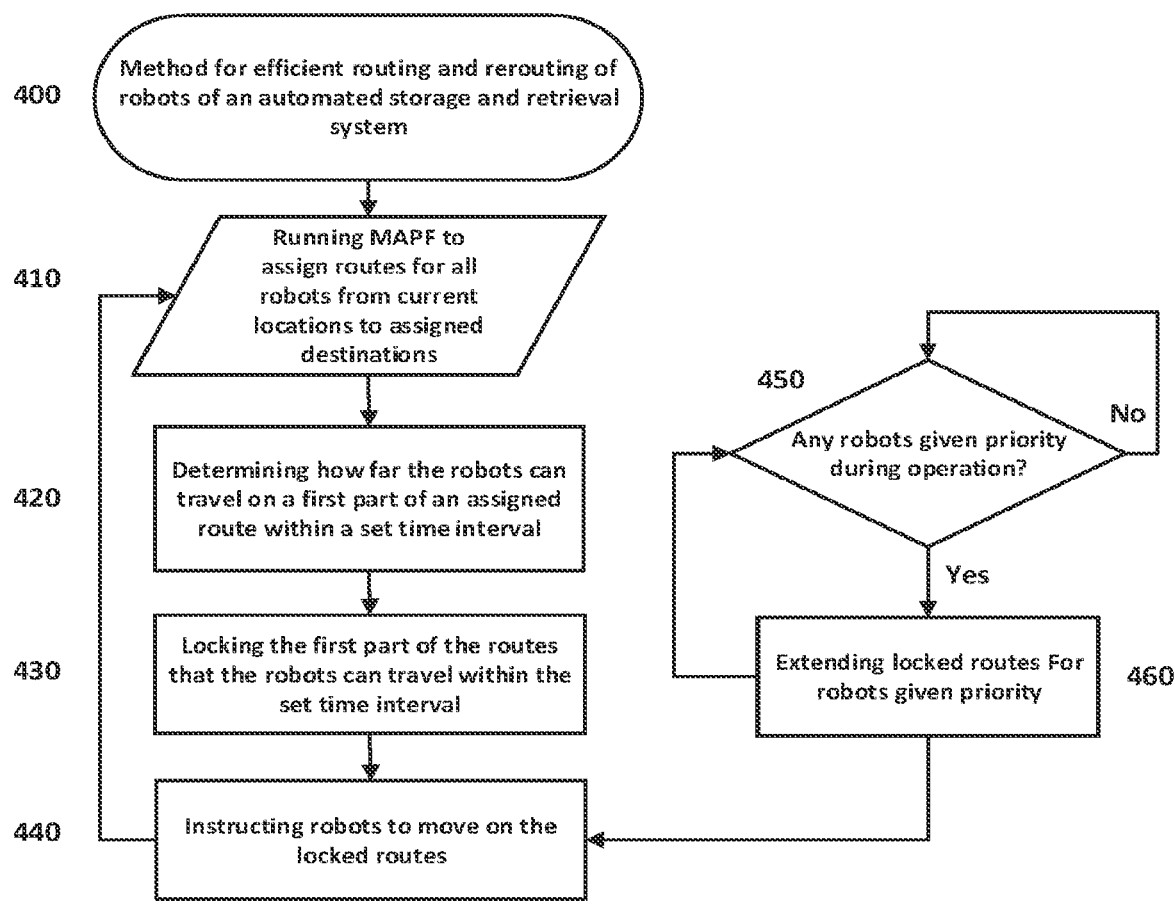
FIG. 3 is a flowchart illustrating the different steps of the method for efficient routing and rerouting of container handling vehicles of an automated storage and retrieval system.

FIG. 3 is a flowchart illustrating the different steps of the method 400 for efficient routing and rerouting of container handling vehicles 201 of an automated storage and retrieval system 1.

The first step 410 of the method is running a multi-agent pathfinding algorithm, MAPF, in the control system 500 for establishing and assigning routes on the rail system 108 for the container handling vehicles 201 from their current locations to assigned tasks at destination locations.

As an example, a task may for instance be to pick up a specified storage container 106 and bring it to a port column located at another location. When several container handling vehicles 201 receive different tasks and destination locations it is vital that the routes they are following on the rail system are unique for each container handling vehicle 201 thereby avoiding collisions.

As mentioned in the introduction, MAPF is used for finding routes used for controlling traffic flow of many agents simultaneously without colliding. In the present case, with the automated storage and retrieval system 1, the agents are the container handling vehicles 201.

The different modules of the control system 500 can be configured as one central control unit executing and controlling all the different steps of the method described herein, or as separate units which are connected to each other to make the control system 500. With separate modules, as shown as an example in FIG. 2, the module named routing planner 200 will be the one running the MAPF for finding feasible routes for the container handling vehicles 201 from their current locations to their destinations and for locking a first part of the routes that cannot be changed. The resulting routes found for the container handling vehicles 201 are communicated to the master controller 220 which will, via the transmitter/receiver 225, control each container handling vehicle according to established routes.

The MAPF can be used for finding routes for all container handling vehicles 201 operating on a grid-based rail system 108 or it can be used for a selected group of container handling vehicles 201.

For larger automated storage and retrieval systems 1, e.g. operated by hundreds of container handling vehicles 201, one or more container handling vehicles 201 can be dedicated to performing specific tasks and operating in allocated areas where they follow preset routes on the rail system 108.

Another example is where a first group of container handling vehicles 201 are controlled according to one MAPF in one area of the rail-system 108, while a second or further group of container handling vehicle 201 are controlled according to another MAPF in another area of the rail-system 108. Different MAPF algorithms can be executed in parallel by different computer systems to speed up execution.

Examples of container handling vehicles 201 performing specific dedicated tasks are for instance digging vehicles preparing a specific storage container 106 for further handling by other container handling vehicles 201 by first removing other storage containers 106 stacked above the specific storage container 106 stored in a storage column 105. Container handling vehicles 201 performing specific dedicated tasks may have different moving patterns and speeds compared to other container handling vehicles 201. These can therefore be separately controlled, or adjustments can be made in the routing decisions to take account of these differences.

Routes for the container handling vehicles 201 are established and assigned after executing the first step 410 of the method, i.e. running a MAPF algorithm. These routes are running from the current location of the container handling vehicles 201 to allocated tasks at destination locations.

The next step 420 of the method is determining how far the container handling vehicles 201 can travel on a first part of the assigned routes within a set time interval. The duration of the set time interval can be set according to the size of the automated storage and retrieval system 1 and the number of container handling vehicles 201 to be included in the MAPF algorithm.

According to one embodiment, the set time interval is a time interval corresponding to the time a container handling vehicle 201 uses to move from its current position to a position on the rail system 108 above a closest adjoining storage column 105. If a container handling vehicle 201 has just passed a position above a storage column 105 it will not be able to change direction until it reaches the next closest adjoining storage column. The time interval will then be the time the container handling vehicle 201 uses for moving to the nearest storage column 105 where it can change directions if necessary.

According to another embodiment, the set time interval corresponds to the execution time the control system 500 uses for running the MAPF algorithm, i.e. for establishing the routes, and instructing the container handling vehicles 201 to move along to established routes. This will provide an optimal way of routing since possible new routes may already have been established by the MAPF algorithm when the container handling vehicles 201 reach the end of the locked routes. The container handling vehicles 201 therefor do not have to stop at the end of a locked route for receiving new driving instructions but can continue and follow the first assigned route or be rerouted to a new route without stopping.

The next step 430 of the method is locking the first parts of the assigned routes that the container handling vehicles 201 can travel within said set time interval. This means that this part of the route cannot be changed, while the rest of the assigned routes established by the MAPF can be changed to new routes starting from end locations of the locked routes.

The next step 440 is instructing the container handling vehicles 201 to move from their current locations to end locations on the assigned locked routes.

Steps 410 to 440 are repeated for each container handling vehicle 201 until they have completed assigned tasks. Each time the method is repeated, it can be seen as an iteration, where each iteration enables rerouting of the container handling vehicles 210 from the routes established by the MAPF in a previous iteration.

According to this method, container handling vehicles 201 may easily change type of task or target before finishing a first assigned task, or new active container handling vehicles 201 can be added for operating on the storage system.

According to one embodiment of the invention, a locked route is extended if a container handling vehicle 201 is given priority. An example of this is when a port signals that it is ready to receive a storage container 106 from the container handling vehicle 201. In this case, the complete route determined by the MAPF for the container handling vehicle 201, running from its current position to the port, is locked and cannot be changed until the assigned task is completed, e.g. delivering a storage container to the port.

According to another embodiment of the invention, a locked route is also extended if a container handling vehicle 201 does not respond to instructions from the control system 500. This may be due to a faulty container handling vehicle 201. It may have stopped somewhere along its locked route or does not respond to instructions, such as rerouting instructions at the end of a locked route. If so, it may then continue to travel somewhere along its assigned route, i.e. that part of the assigned route that is not locked. By locking the complete route established by the MAPF, other container handling vehicles will avoid colliding with it.

By extending locked routes to include the complete routes established by the MAPF algorithm, i.e. from current locations of the container handling vehicles 201 to tasks at destination locations, possible conflicts with other container handling vehicles 201 are avoided. This is favorable when for instance a container handling vehicle 201 is given priority or when a port signals that it is ready to interact with an assigned container handling vehicle 201.

According to one embodiment of the method, locked routes are excluded from execution in the MAPF algorithm. For container handling vehicles 201 operating normally without priority this means that their current location is used as an input to the MAPF algorithm, i.e. the current locations provide one set of the end locations for the locked routes. For container handling vehicles 201 with priority, or faulty container handling vehicles 201, the complete established route to the assigned task at destination locations is excluded from further execution in the MAPF algorithm.

Determining which container handling vehicles that are given priority can be based on several factors. Some tasks impact performance more than other tasks. A container handling vehicle 201 assigned to deliver a storage container 106 in a port is normally prioritized compared to a container handling vehicle 201 assigned to deliver a storage container 106 to a storage column 105. Optimal routes are normally first created for prioritized container handling vehicles 201. There are different routing algorithms for route prioritizing and determining optimal routes.

These are based on cost functions with a set of different input parameters such as time and distance to reach a destination, priority of the assigned task, expected waiting time at a port etc.

As mentioned, the MAPF algorithm is used for establishing and assigning routes on the rail system 108 for the container handling vehicles 201 from their current locations to tasks at destination locations. Inputs to the MAPF algorithm are the layout of the rail system 108, operating container handling vehicles 201 and current location and destination location of each container handling vehicle 201.

According to one embodiment of the method, additional input to the MAPF algorithm are a clearance required between each route established by the MAPF algorithm for example, to provide sufficient clearance to avoid collisions with a margin. A required clearance is adapted to type of container handling vehicle 201 used for a task as well as types of rails used on the route to the tasks at destination locations.

A double-track rail configuration allows two container handling vehicles to pass each other on rails on two adjacent storage columns 105. Single-track rail configurations do not allow container handling vehicles 201 to pass and may require a passing clearance corresponding to at least the footprint of one storage column between two passing container handling vehicles 201 if it is not possible to move the obstructing container handling vehicle out of the way.

According to one embodiment of the method, movements of the container handling vehicles 201 are further controlled to avoid possible queueing problems at destination locations. This can be done in different ways. If for instance it is foreseen that several container handling vehicles 201 will arrive at the same port at about the same time, they can be ranked and driving speeds of lowest ranked container handling vehicles 201 can be reduced or they can be stopped at a location where they are out of the way until a first ranked container handling vehicle 201 has finished its task at the port. Another way of avoiding a foreseen queueing problem is for instance to redirect container handling vehicles to finish assigned tasks at other destination locations, e.g. to deliver a storage container 106 at another port.

There are different container handling vehicles having different specifications such as acceleration, speed, maximum load. Additional input to the MAPF algorithm may be to provide details of the type of container handling vehicles 201 assigned to perform a task as well as current load on the container handling vehicle 201 based on the weight of a transported storage container 106 and the condition of the container handling vehicle 201, e.g. low battery, worn parts, wheel grip etc. Such additional input can affect how movements of the container handling vehicle 201 are controlled and whether clearances between vehicles need to be increased.

Figure 4:
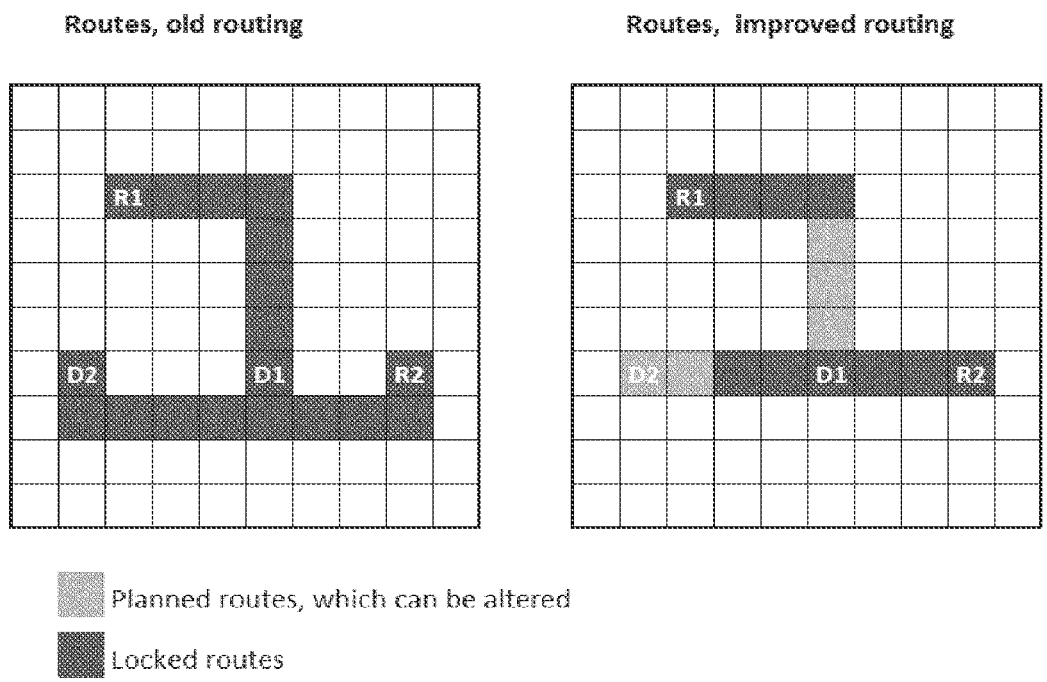
FIG. 4 illustrates a simple routing example according to previous and new routing.

FIG. 4 illustrates a simple example of how routes where established according to the old routing method and how routes are established according to the improved routing method described above.

R1 and R2 indicate current locations of container handling vehicles 1 and 2. D1 and D2 indicate destination locations for the container handling vehicle 1 and 2.

In this example, robot 1 at R1 receives a task just before robot 2 at R2 receives a task. According to previous routing systems, a route running from the current location R1 of robot 1 to its destination D1 would be made and locked first. Next, a route for robot 2 would be made, and this is made such that it is not in conflicts with the established locked route of robot 1. As seen from FIG. 4, the route for robot 2 is not optimal in terms of distance travelled as it needs to avoid grid space D1 and possibly any other locked grid spaces on the assigned route from R1 to D1.

According to the improved routing method disclosed herein, only a first part of the routes established for the container handling vehicles are locked, while the last part of the established route is a planned routed that can be changed. This means that when the container handling vehicles reach the end of the locked routes, and the MAPF algorithm is run again, they can be rerouted to follow a new route from current starting positions at the end of the locked routes.

The last part of the route for robot 1 will therefore not be locked, assuming that robot 1 has not yet reached the end of the first locked part, when a route for robot 2 is established by the MAPF algorithm, resulting in optimal routes for both container handling vehicles.

This new way of routing is both flexible and efficient and considers all routes of all container handling vehicles 201 to their assigned destination locations at multiple stages while a given container handling vehicle is making its way along an assigned route.

The invention is further defined by a control system 500 for controlling efficient routing and rerouting of container handling vehicles 201 handling storage containers 106 in an automated storage and retrieval system 1 as the one described above with reference to FIG. 1.

The control system 500 is described above with reference to FIG. 2. It further comprises a processor arranged for running a computer program that when executed performs the method described above, with reference to FIG. 3, thereby enabling efficient routing and rerouting of container handling vehicles 201 handling storage containers 106 in an automated storage and retrieval system 1. The computer program might be running in a processor in the routing planner 200.

What is claimed is:

1. A system comprising:
   an automated storage and retrieval system comprising a framework structure forming a three-dimensional storage grid structure for storing storage containers in storage columns;
   a plurality of container handling vehicles, each container handling vehicle of the plurality of container handling vehicles being configured to move along a first lateral direction of a grid-based rail system of the framework and along a second lateral direction of the grid-based rail system, the second lateral direction being perpendicular to the first lateral direction; and
   a processor configured to control movements of the plurality of container handling vehicles based upon a pathfinding algorithm comprising functionality to:
   determine and assign tasks that are to be completed by specified container handling vehicles, destination locations for performing the tasks, and routes that the plurality of container handling vehicles are to travel on the grid-based rail system,
   wherein determining the routes by which the plurality of container handling vehicles are to travel on the grid-based rail system comprises:
   establishing and assigning a first set of routes on the grid-based rail system that extend from current locations of the plurality of container handling vehicles to the destination locations of the assigned tasks of the plurality of container handling vehicles;
   determining a first part of each route of the first set of routes, the first part being a distance a container handling vehicle is expected to travel on an assigned route of the first set of routes within a set time interval;
   locking the first part of each route of the first set of routes, thereby preventing the first part of each route of the first set of routes from changing and excluding the first part of each route from consideration of subsequent routes determined while running the pathfinding algorithm;
   instructing the plurality of container handling vehicles to move from the current locations to the destination locations of the assigned tasks of the plurality of container handling vehicles on the first set of routes;
   changing at least one task of the assigned tasks that is assigned to a particular container handling vehicle of the plurality of container handling vehicles prior to the particular container handling vehicle finishing a first assigned task of the assigned tasks;
   establishing and assigning a second set of routes on the grid-based rail system for the plurality of container handling vehicles from the current locations of the plurality of container handling vehicles to the destination locations of the assigned tasks of the plurality of container handling vehicles; and
   instructing the plurality of container handling vehicles to move from the current locations of plurality of container handling vehicles to the destination locations of the assigned tasks of the plurality of container handling vehicles on the second set of routes.

2. The system according to claim 1, wherein the processor is further configured to control the movements of the plurality of container handling vehicles based upon a route prioritizing algorithm comprising the functionality to determine and assign a priority to each container handling vehicle of the plurality of container handling vehicles.

3. The system according to claim 2, wherein determining the routes by which the plurality of container handling vehicles are to travel on the grid-based rail system further comprises extending the first part of each route of the first set of routes that are locked for a prioritized container handling vehicle of the plurality of container handling vehicles given priority.

4. The system according to claim 2, wherein a set of input parameters of the route prioritizing algorithm comprises at least one of the following:
   a priority of the task assigned to a container handling vehicle;
   a priority of the destination location of the container handling vehicle;
   a time required to reach the destination location from the current location of the container handling vehicle;
   a distance required to reach the destination location from the current location of the container handling vehicle; and
   an expected wait time for the container handling vehicle at the destination location of the container handling vehicle.

5. The system according to claim 1, wherein a set of input parameters of the pathfinding algorithm comprises at least one of the following:

a layout of the grid-based rail system;
a type of rail employed by the grid-based rail system;
a priority of each container handling vehicle of the plurality of container handling vehicles;
the current location of the plurality of container handling vehicles;
the destination location of the plurality of container handling vehicles;
a clearance required between each route of the first set of routes in order to prevent collisions of the plurality of container handling vehicles; and
characteristic of each container handling vehicle of the plurality of container handling vehicles.

6. The system according to claim 1, wherein the movements and speeds of a container handling vehicle are determined by the processor based on the assigned task of the container handling vehicle.

7. The system according to claim 1, wherein the destination locations of one or more container handling vehicles are changed by the processor in order to prevent a possible queueing problem at the destination locations.

8. The system according to claim 1, wherein the movements of the plurality of container handling vehicles are controlled by the processor in order to prevent a possible queueing problem at the destination locations by controlling a speed of each container handling vehicle based upon a priority of each container handling vehicle.

9. The system according to claim 1, wherein the movements of the plurality of container handling vehicles are controlled by the processor in order to prevent a possible queueing problem at the destination locations by pausing the movements of one or more plurality of container handling vehicles which are not a prioritized container handling vehicle.

10. The system according to claim 1, wherein determining the routes by which the plurality of container handling vehicles are to travel on the grid-based rail system further comprises locking the route of one or more container handling vehicles of the plurality of container handling vehicle from the current locations of the one or more container handling vehicles to the destination locations of the one or more container handling vehicles.

11. The system according to claim 1, wherein the plurality of container handling vehicles comprises a first group of container handling vehicles and additional groups of container handling vehicles, the first group of container handling vehicles being controlled by the pathfinding algorithm within a first area of the grid-based rail system and the additional groups of container handling vehicles being controlled by additional pathfinding algorithms within additional areas of the grid-based rail system.

12. A method comprising:
forming, by a framework of an automated storage and retrieval system, a three-dimensional storage grid structure for storing storage containers in storage columns;
moving a plurality of container handling vehicles along a first lateral direction and along a second lateral direction of a grid-based rail system of the framework, the second lateral direction being perpendicular to the first lateral direction; and
controlling, by a processor, movements of the plurality of container handling vehicles based upon a pathfinding algorithm comprising functionality to: determine and assign tasks that are to be completed by specified container handling vehicles, destination locations for performing the tasks, and routes that the plurality of container handling vehicles are to travel on the grid-based rail system,
wherein determining the routes by which the plurality of container handling vehicles are to travel on the grid-based rail system comprises:
establishing and assigning a first set of routes on the grid-based rail system that extend from current locations of the plurality of container handling vehicles to the destination locations of the assigned tasks of the plurality of container handling vehicles;
determining a first part of each route of the first set of routes, the first part being a distance a container handling vehicle is expected to travel on an assigned route of the first set of routes within a set time interval;
locking the first part of each route of the first set of routes, thereby preventing the first part of each route of the first set of routes from changing and excluding the first part of each route from consideration of subsequent routes determined while running the pathfinding algorithm;
instructing the plurality of container handling vehicles to move from the current locations to the destination locations of the assigned tasks of the plurality of container handling vehicles on the first set of routes;
changing at least one task of the assigned tasks that is assigned to a particular container handling vehicle of the plurality of container handling vehicles prior to the particular container handling vehicle finishing a first assigned task of the assigned tasks;
establishing and assigning a second set of routes on the grid-based rail system for the plurality of container handling vehicles from the current locations of the plurality of container handling vehicles to the destination locations of the assigned tasks of the plurality of container handling vehicles; and
instructing the plurality of container handling vehicles to move from the current locations of plurality of container handling vehicles to the destination locations of the assigned tasks of the plurality of container handling vehicles on the second set of routes.

13. The method according to claim 12, further comprising controlling the movements of the plurality of container handling vehicles based upon a route prioritizing algorithm comprising the functionality to determine and assign a priority to each container handling vehicle of the plurality of container handling vehicles.

14. The method according to claim 13, wherein determining the routes by which the plurality of container handling vehicles are to travel on the grid-based rail system further comprises extending the first part of each route of the first set of routes that are locked for a container handling vehicle of the plurality of container handling vehicles given priority.

15. The method according to claim 12, further comprising determining the movements and speeds of a container handling vehicle based on the assigned task of the container handling vehicle.

16. The method according to claim 12, further comprising changing the destination locations of one or more container handling vehicles in order to prevent a queueing problem at the destination locations.

17. The method according to claim 12, further comprising controlling the movements of the plurality of container handling vehicles in order to prevent a queueing problem at the destination locations by controlling a speed of each container handling vehicle based upon a priority of each container handling vehicle.

18. The method according to claim 12, further comprising controlling the movements of the plurality of container handling vehicles in order to prevent a queueing problem at the destination locations by pausing the movements of one or more of container handling vehicles which are not a prioritized container handling vehicle.

19. The method according to claim 12, wherein determining the routes by which the plurality of container handling vehicles are to travel on the grid-based rail system further comprises locking the route of one or more container handling vehicles of the plurality of container handling vehicle from the current locations of the one or more container handling vehicles to the destination locations of the one or more container handling vehicles.

20. The method according to claim 12, further comprising controlling a first group of container handling vehicles by the pathfinding algorithm within a first area of the grid-based rail system and controlling additional groups of container handling vehicles by additional pathfinding algorithms within additional areas of the grid-based rail system.

* * * * *